Jan. 1, 1952 — P. McH. ALBERT — 2,580,500
DEVICE FOR DETERMINING TURBIDITY WITHIN A BODY OF LIQUID
Filed April 25, 1949
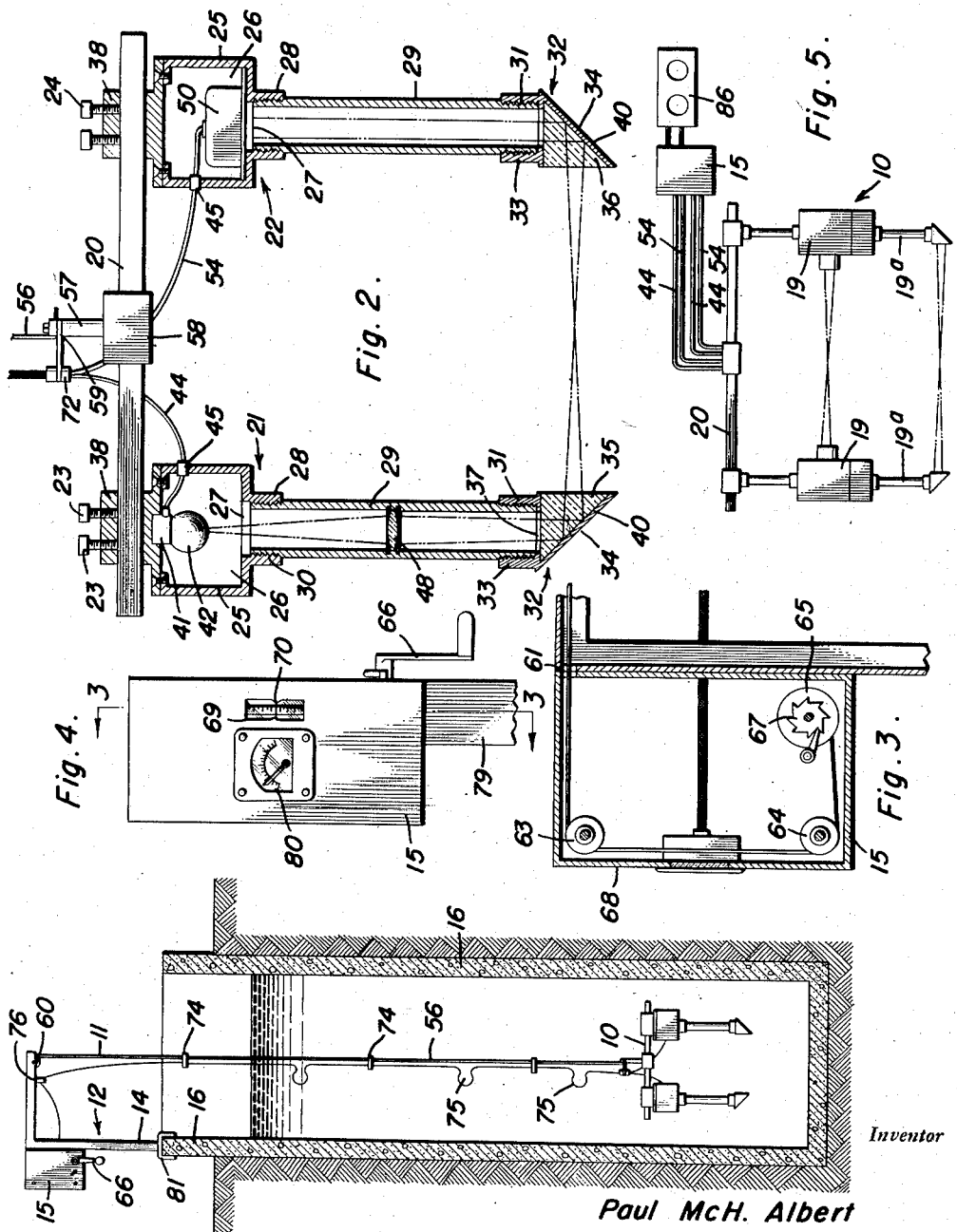
Inventor
Paul McH. Albert
By Clarence A. O'Brien
and Harvey B. Jacobson
Attorneys Patented Jan. 1, 1952

2,580,500

UNITED STATES PATENT OFFICE 2,580,500

DEVICE FOR DETERMINING TURBIDITY
WITHIN A BODY OF LIQUID

Paul McH. Albert, Ann Arbor, Mich.

Application April 25, 1949, Serial No. 89,524

2 Claims. (Cl. 88—14)

This invention relates to apparatus for determining the turbidity of fluids and it has for its main object to provide a turbidimeter which is arranged for immersion and for horizontal and vertical displacement and which is therefore capable of measuring the turbidity existing at any given place within a body of liquid irrespective of the circumstance whether said liquid is at rest or flowing or is contained within its natural bed or is stored within a reservoir, a tank or the like.

Many industrial operations require a continuous or current measurement of the turbidity of a liquid and it has therefore been customary to measure the turbidity of a liquid in bulk by means of photometric operations, for instance by using a photo-electric cell and a source of light arranged on both sides of a transparent cell, container or conduit through which the liquid to be measured passes. The turbidity is then measured by the extent to which light passing through the said cell, container or conduit is absorbed. The container or conduit may either be located in the main stream of the liquid or in a side stream.

The photo-electric cell and the source of light furnishing the beam passing through the liquid are in these cases always arranged outside the liquid itself and the latter or a part thereof passes between them in the form of a sheet or layer or of a small streamlet carrying a given quantity of the liquid past the beam within a given time. Obviously this method is mainly applicable to cases in which the liquid is flowing or streaming continuously, for instance to cases in which a liquid product of a manufacturing or refining process is on its way to further treatment or to a storage or transportation tank. Likewise the method may for instance be applied to the case of drinking water pumped from a collecting reservoir into local reservoirs or into a pipe line.

Where motionless or stagnant liquids have to be investigated either samples have currently to be taken and to be filled in appropriate cells or containers placed into the beam impinging on the photo-electric cell or an artificial circulation for measuring purposes through a transparent conduit has to be produced.

It is however obvious that these two last named methods present many drawbacks and difficulties especially in those cases in which the exact configuration of strata of different turbidity has to be mapped or where the variation of the turbidity at certain points has to be traced currently. In addition to technical difficulties both methods are likely to disturb the existing conditions and moreover there is an appreciable time lag between the taking of the samples and the measurement. Turbidity measurements taken in this way are therefore deficient in accuracy.

The present invention has for its object to provide photo-electric measuring equipment which is submersible and displaceable in three dimensions and which therefore permits to bring the beam the absorption of which has to be measured to any predetermined point within a body of liquid at which turbidity measurement is desirable.

A further object of the invention consists in subdividing the equipment in such a manner that the measuring beam can be produced at a predetermined point within the body of liquid while the indicating apparatus remains stationary and outside the body of liquid thus permitting current reading and recording of the indications by a stationary observer.

It is a further object of the invention to provide a device for detecting or measuring turbidity by the absorption of light within a liquid which is so subdivided that the beam producing and beam receiving means are submersible and are moreover provided with means for changing the depth of submersion, said means being further provided with depth indicators permitting to gauge exactly the point at which the equipment is used.

It is a further object of the invention to provide turbidity measuring equipment which may be displaced horizontally along the body of the liquid the indicating equipment being in this case displaced simultaneously with the beam producing and depth changing equipment.

It is a further object of the invention to provide means for indicating the position of the beam within the liquid which are readable concurrently with the indication relative to the light absorption.

It is a further object of the invention to provide a beam producing and a beam receiving light sensitive unit which is so constructed that it will not be materially affected by light penetrating into the body of liquid from above which varies with the depth to which the equipment is submerged and with the light absorbing properties of the liquid.

It is a further object of the invention to provide a turbidity indicating or measuring device of the type measuring the light absorption within a liquid in which the light beam is projected between two independent, spaced structures facing each other which are rigidly connected at one end and which form a submersible unit, said unit being preferably so arranged that the beam passes horizontally near one end of the structure when the unit is in operative position.

It is a further object of the invention to provide a travelling turbidity detector for indicating or measuring the turbidity at any desired point within a body of liquid in which spaced, watertight light beam projecting and light beam receiving structures are used which are wedge-shaped at their ends so as to cause a minimum of disturbance in the liquid when moved.

It is a further object of the invention to provide a turbidity detector having spaced box-like structures fixedly but adjustably held at a predetermined distance on a horizontal crossbar, each of said structures being provided with tubular distance pieces projecting downwardly from said crossbar at right angles thereof, said distance pieces being provided with reflecting prisms with vertical exit surfaces facing each other, said prisms permitting to send a horizontal light beam through the liquid in which the structure is submerged near the lowermost end of the structure.

Further and more specific objects of the invention will be apparent from the following detailed specification. The invention is illustrated in the accompanying drawings showing one modification and two applications of the same by way of example. It is however to be understood that these examples intend to illustrate mainly the principle of the invention and the best modes of applying this principle. Modifications of the examples shown are therefore not necessarily departures from the principle of the invention.

In the accompanying drawing the invention is illustrated in a purely diagrammatic manner.

Figure 1 is a diagrammatic cross section through a tank showing the units of the turbidity detector or meter in their relative positions during the taking of measurements.

Figure 2 is a diagrammatic sectional and elevational view of the beam producing and beam receiving and absorption measuring unit.

Figure 3 is a diagramamtic sectional elevational view of the meter box and of the steel tape reeling mechanism the section being taken along line 3—3 of Figure 4.

Figure 4 is an outside view of the meter box.

Figure 5 illustrates a further application of the invention as an automatic indicator for the height of a sludge bed in a tank.

As above explained the invention essentially consists in means for bringing the beam of a light absorption turbidity meter to a point within the body of liquid to be investigated, the sample or batch the turbidity of which is to be measured being therefore within its natural or customary environment. This method is therefore distinguished from the methods used according to the prior art in which the sample or batch was always brought to the apparatus measuring the turbidity either by directing the flow of part of the liquid through the apparatus or by the transportation of the sample or batch to the point at which said turbidity is measured.

In order to bring the beam to a desired point within a body of liquid at which the light absorption is to be measured the apparatus must be divided into a number of displaceable units or sections. These sections include a beam producing and beam receiving submersible section 10, the depth changing mechanism 11 and the horizontally displaceable unit 12 which comprises gallows, a derrick or the like forming a horizontally displaceable structure 14 and the meter box 15 which is attached to the last named structure.

In the example shown in Figure 1 it is assumed that the liquid is contained in a relatively narrow settling or sedimentation tank 16 and has to be currently checked with respect to its turbidity and that layers or clouds of sediments have to be located. In such a case it is, as a rule, not the absolute but the relative turbidity which has to be measured, although the instrument may of course be constructed for absolute indication.

The measuring or beam emitting and receiving unit 10 in this case comprises a cross bar 20 on which two liquid tight substantially tubular columns 21, 22 may be fixedly attached. Preferably this attachment is however adjustable. Each of said two columns is therefore provided with a head 38 which may be fixed on the crossbar 20 by means of adjustment screws 23, 24.

Each tubular column 21, 22 consists of a liquid tight box or case 25 forming a compartment 26 which has an opening 27 surrounded by an internally threaded tubular projecting sleeve 28. A tubular distance piece 29 of appropriate length and provided with fine threads 30, 31 at both ends engages the threads of the sleeve 28 and is held therein in a liquid tight manner. On its other end the tubular distance piece 29 carries a holder or frame 32 provided with an internally threaded sleeve 33 engaging the threads 31 of the tubular distance piece. Said holder or frame 32 moreover comprises a prism support 34 joined to the sleeve 33 but provided with an opening 37 at the junction.

The construction of the two columns 21, 22 is alike and corresponding parts are therefore provided with identical reference numerals. The prism supports 34 of the two columns 21, 22 carry the two prisms 35, 36 respectively each of which has a reflecting surface 40 arranged at an angle of approximately 45° with respect to the axis of the column. The two outer surfaces of the prisms are turned towards each other and these faces are held in exact parallelism to each other at a distance which is fixed and adjusted by means of the screws 23, 24 in the head 38.

The box 25 of the column 21 carries a lamp socket 41, preferably arranged in the axis of the column which is provided with appropriate electric connections. From the contacts of the socket a heavily insulated cable 44 leads to a liquid tight rubber sleeve 45 or the like, acting as a seal, and to the outside where the cable is suspended and supported in the manner described below.

The socket 41 carries the exciter lamp 42 which is of the customary type and which sends its rays through opening 27 to a collector lens system 48. The lens system 48 is arranged in and is carried by the tubular distance piece 29 and it directs the rays towards the reflecting prism 35 from the reflecting surface 40 of which the rays are reflected and are sent through the column of liquid the turbidity of which has to be analyzed and which is defined by the two faces of the prisms 35, 36 turned towards each other. The beam then reaches the second prism 36, passes through said prism to the reflecting surface 40 and is then reflected along the axis of the tubular distance piece 29 towards the box 25 of the column 22 in which the selenium or other photo-electric cell 50 is arranged so as to cover the opening 27 of the box 25. A heavily insulated shielded cable 54 may lead from the cell 50 to the outside passing through a sleeve 45 which forms a liquid tight seal.

It will be understood that the lens system 48 may focus the beam in such a way that it is concentrated in the well known manner so that the action of the beam and the cell current may be proportional.

The above described construction permits the passage of the analyzing beam at a point which is only at a very short distance above the lowermost edge of the unit. It will also be noted that the columns 21, 22 taper off into a line at the lowermost end. These columns are of relatively small diameter and therefore a movement of the unit through the liquid and especially a movement in a vertical direction will hardly cause a disturbance of the sediment in the tank which will be capable of affecting the conditions under which measurements are made.

It will also be noted that this construction permits the beam to come down within a fraction of an inch of the bottom so that measurements in the lowest zone may be made without any difficulty.

The unit 10 is preferably suspended on a steel tape 56 in such a manner that the crossbar is horizontal which position corresponds to a horizontal analyzing beam, as the beam is parallel to the crossbar. The steel tape may be attached to a post 57 of a suspension block 58 arranged in the middle of the crossbar 20.

The steel tape 56 is provided with a graduation along its entire length. It runs from its point of attachment at 59 on post 57 up to a roller 60 which is shown in Figure 1 as being mounted on the end of an arm of the gallows 12. While the roller is shown as being fixed on the projecting arm of the gallows it will be clear that if a tank of considerable width has to be explored the roller will be mounted on a carriage attached to an endless cable by means of which the carriage may be moved along the arm of the gallows, if necessary.

The steel tape then runs through a slot 61 into the meter box 15 within which guide rollers 63, 64 are provided and is finally secured to a reeling spool or drum 65 by means of which it may be reeled or unreeled. A crank 66 and a ratchet wheel and pawl 67 are provided for holding the spool or drum in its position and for rotating it.

The guide rollers 63 and 64 are so located within the box that the steel tape passes close to the front wall 68 of the box. In the front wall windows 69 are provided which carry a mark 70. Lenses or magnifying half-cylindric pieces of glass or plastic (not shown) may be inserted into the windows permitting to read the graduations of the tape passing the mark 70. The operator may thus lower the unit 10 to a definite predetermined depth by observing the graduation marks on the steel tape.

The cables 44, 54 are preferably loosely suspended between the sleeves 45 and the further sleeve 72 which is carried by the post 57 by means of a short bracket. The cables may be reeled up separately by means of a drum but in the diagram a simple method is shown according to which the cables are provided with eyes 74 attached to them and surrounding the steel take 56. Between the eyes loops 75 are formed in the cables when the tape is wound up and the eyes are arrested on the upper end. The cables are then hanging down in loops when the unit 10 is raised to an upper level.

The cables may run through a cable guide 76 provided on the projecting arm of the gallows near the guide roller 60.

The meter box 15 carries the microammeter 80 which provides the desired turbidity indication. This microammeter is connected with the selenium or other photo-electric cell 50 by means of the shielded cable 54. The meter box itself is mounted on the standard 19 of the gallows which may be provided with a foot 81 riding on or slidable on the ground or upper portion of the wall of the tank 16. Finally the meter box may also carry the source of current or the necessary means for connection with the source of current and the switches, resistances and other electric units which are connected with the apparatus.

This equipment is not shown in the drawing and is not described as it does not differ from the usual equipment used in connection with other turbidity meters.

The operation of the device includes the displacement of the unit which is brought to the desired place along the tank, and it also includes the lowering of the unit 10 by means of the steel tape and the energizing of the exciter lamp whereupon the microammeter may be read.

In a special case in which for instance the height of the sludge blanket in a sedimentation tank has to be determined the operator will always keep the unit 10 immediately below the water level within the tank in order to keep the surfaces of the prisms in a wet condition so as to prevent clouding of the surfaces by drying deposits. Moreover, if kept immersed, the problem of preventing condensation of moisture in the tubular columns and boxes is more easily solved because the temperature is approximately constant. Preferably a small quantity of silica gel or any other moisture absorbing substance is carried within the compartment 26 which absorbs the moisture due to condensation following a change in temperature. If moisture should have condensed, for instance because the silica gel has absorbed all the moisture it can carry, this fact is registered on the meter as, in clear water on the surface, for instance the meter would show less than the reading which corresponds to the minimum of absorption of the full beam. In this case the unit must be withdrawn and must be provided with a further supply of moisture absorbing substances. If the meter reading in limpid water corresponds to the accepted value the beam carrying unit may be lowered and the meter is observed. If a definite sludge blanket exists the reading will suddenly change to zero or near zero during a descent of the beam carrying unit of only an inch or a similar small distance. The upper surface zone of the blanket will then be determined easily as in the said zone rapid fluctuations occur.

It is important in such a case that the beam carrying unit should not disturb the sludge blanket as otherwise a determination of the surface zone is less accurate and is more difficult.

After having completed the measurements the beam unit is best kept near the surface with the prism surfaces immersed in water as above indicated.

It is important that the prism faces which are turned towards the water are vertical as they will be clean when moved about in this position and as in this case a deposit of substances on the surfaces is prevented.

Two beams 19 and 19a (Fig. 5) may be used in one and the same apparatus at a certain spot for the purpose of automatically announcing the lowering of the sludge blanket or the rising of the blanket above a certain level. In this case an indicator 86 such as a light or a bell is connected with the microammeter.

The sensitivity of the arrangement may of course be selected according to the circumstances. In exploring operations such as above described in which conditions at different points of a tank have to be investigated currently it is usually only necessary to supply relative or comparative indications.

It will be understood that changes of an unessential nature will not in any way affect the essence of the invention.

Having described the invention, what is claimed as new is:

1. A device for measuring turbidity at a plurality of predetermined points within a body of liquid, comprising a substantially horizontal crossbar, two separate, spaced, liquid tight box structures, slidably mounted for separate movement on said cross bar and shiftable and adjustable along said crossbar, means for fixing said box structures at a predetermined distance from each other, said crossbar and box structures forming a submersible unit, one of said box structures enclosing an exciter lamp and the other enclosing a light sensitive photo-electric cell, a substantially vertical ray conducting tube projecting downwardly from each of said box structures, the tube projecting from the box enclosing the exciter lamp being provided with ray concentrating means producing a well defined bundle of rays of predetermined cross sectional area, reflecting prisms at the end of said tubes, one of the faces of the reflecting prisms being turned towards the tube and being perpendicular to the axis of the same and the other faces of the reflecting prisms being parallel to the said axis and facing each other, thus forming a beam exit and beam entrance surface for the bundle of light rays respectively, at a distance from the crossbar, means for supporting, lowering and lifting the submersible unit within the body of liquid, said means maintaining a substantial horizontal position of the crossbar and further means for displacing said unit and supporting means horizontally along said body of liquid.

2. A device for measuring turbidity at a plurality of preselected points within a body of liquid, comprising a crossbar, two separate, spaced, submersible liquid tight box structures slidably mounted for separate movement and adapted to be shifted and adjustably fixed along said crossbar at a preselected distance from each other, said crossbar and box structures forming a submersible unit, a tube projecting from each box structure at right angles to the crossbar and a reflecting prism at the end of each of said tubes, having a reflecting and two non-reflecting surfaces, said prism being so mounted that it forms a wedge at the end of the tube having its thin edge directed downwardly and acting as a flow directing, disturbance preventing element, one of said box structures enclosing in its interior an exciter lamp, directed towards the reflecting surface of the reflecting prism at the end of the tube, said tube being provided with ray concentrating optical means for producing a concentrated light beam of predetermined cross sectional area, the other box structure enclosing a light sensitive photo-electric cell, turned towards the reflecting surface of the reflecting prisms at the end tubes, the non-reflecting surfaces of the prisms being at right angles to the axes of the tubes and parallel to the tube axes respectively, the last named non-reflecting surfaces being the beam exit and beam entrance surfaces, facing each other across a stretch of liquid of a length determined by the adjustment of the position of the box structure on the crossbar, a steel tape provided with graduations attached to said crossbar, a fixed structure outside the body of liquid, including a projecting arm supporting guide rollers and a reel for said steel tape, said structure being provided with supporting means horizontally displaceable along the body of liquid, a meter box attached to said displaceable outside structure, the meter box containing said reel and an electric measuring instrument and means for supplying current to said lamp and to said light sensitive photo-electric cell, said means including an insulated cable leading from said meter box to each of said box structures for connecting the measuring instrument and the means for supplying current to said photo-electric cell and to said exciter lamp respectively, and said box being further provided with a window and with a marker, the former being arranged so as to display the steel tape and its graduation, with the marker furnishing an indication of the depth to which the beam emitting prisms has been lowered readable simultaneously with the reading of the measuring instrument.

PAUL McH. ALBERT.

REFERENCES CITED

The following references are of record in the file of this patent:

UNITED STATES PATENTS

| Number | Name | Date |
| --- | --- | --- |
| 1,958,252 | Singleton et al. | May 8, 1934 |
| 2,111,068 | Huebner | Mar. 15, 1938 |
| 2,203,720 | Dale | June 11, 1940 |
| 2,394,129 | West | Feb. 5, 1946 |
| 2,427,013 | Mac Adams | Sept. 9, 1947 |
| 2,449,783 | Laidig et al. | Sept. 21, 1948 |